(12) United States Patent
Inoue et al.

(10) Patent No.: US 8,544,620 B2
(45) Date of Patent: Oct. 1, 2013

(54) SUSPENSION APPARATUS FOR VEHICLE

(75) Inventors: Hirofumi Inoue, Toyota (JP); Takuhiro Kondo, Kani (JP)

(73) Assignees: Toyota Jidosha Kabushiki Kaisha, Toyota-Shi (JP); Kayaba Industry Co., Ltd., Tokyo (JP)

( * ) Notice: Subject to any disclaimer, the term of this patent is extended or adjusted under 35 U.S.C. 154(b) by 1252 days.

(21) Appl. No.: 11/791,320

(22) PCT Filed: Nov. 10, 2005

(86) PCT No.: PCT/JP2005/021077
§ 371 (c)(1),
(2), (4) Date: May 23, 2007

(87) PCT Pub. No.: WO2006/057190
PCT Pub. Date: Jun. 1, 2006

(65) Prior Publication Data
US 2008/0164111 A1      Jul. 10, 2008

(30) Foreign Application Priority Data
Nov. 24, 2004   (JP) ................. 2004-339476

(51) Int. Cl.
*F16F 9/24*    (2006.01)
*F16D 57/00*   (2006.01)

(52) U.S. Cl.
USPC .. 188/297; 188/156; 188/322.16; 188/321.11

(58) Field of Classification Search
USPC ......... 188/313–318, 322.12–322.16, 322.18, 188/321.11, 297, 304, 281, 266.1, 156; 280/5.515, 6.159
See application file for complete search history.

(56) References Cited

U.S. PATENT DOCUMENTS

| | | | | |
|---|---|---|---|---|
| 4,815,575 A | * | 3/1989 | Murty | 188/266.1 |
| 5,070,284 A | | 12/1991 | Patil et al. | |
| 5,293,969 A | * | 3/1994 | Yamaoka et al. | 188/266.5 |
| 5,678,847 A | | 10/1997 | Izawa et al. | |
| 2004/0150361 A1 | | 8/2004 | Hio et al. | |
| 2009/0120745 A1 | * | 5/2009 | Kondo et al. | 188/267 |
| 2009/0321201 A1 | * | 12/2009 | Sakuta et al. | 188/290 |
| 2010/0200343 A1 | * | 8/2010 | Kondo et al. | 188/267 |

FOREIGN PATENT DOCUMENTS

| | | |
|---|---|---|
| EP | 0 391 066 A1 | 3/1990 |
| EP | 495565 A2 * | 7/1992 |
| JP | 04-126615 A | 4/1992 |
| JP | 04-303010 A | 10/1992 |
| JP | 08-197931 A | 8/1996 |

(Continued)

*Primary Examiner* — Melody Burch
(74) *Attorney, Agent, or Firm* — Kenyon & Kenyon LLP

(57) ABSTRACT

It is an object of the invention to improve utility in a suspension apparatus for a vehicle having an electromagnetic actuator and a hydraulic damper. In the suspension apparatus, a hydraulic damper is disposed between an electromagnetic actuator and a wheel-holding portion, and a cover tube is provided for accommodating a seal provided between a piston rod and a housing of the hydraulic damper. In the suspension apparatus according to the present invention wherein the hydraulic damper is disposed between the wheel-holding portion and the electromagnetic actuator, it is possible to effectively mitigate not only transmission of vibrations to the vehicle body from the wheel via the electromagnetic actuator but also transmission of vibrations to the electromagnetic actuator. Further, owing to the presence of the cover tube, entry of dust and the like into the hydraulic damper through the seal can be effectively prevented.

7 Claims, 6 Drawing Sheets

(56) References Cited

FOREIGN PATENT DOCUMENTS

| | | | |
|---|---|---|---|
| JP | 10-246270 A | | 9/1998 |
| JP | 2001108003 A | * | 4/2001 |
| JP | 2001-180244 A | | 7/2001 |
| JP | 2004-237824 A | | 8/2004 |
| JP | 2004-299559 A | | 10/2004 |
| JP | 2005-256887 A | | 9/2005 |
| JP | 2005258920 A | * | 9/2005 |
| WO | WO 02/08001 A1 | | 1/2002 |

* cited by examiner

EXPANSION | CONTRACTION

EXPANSION | CONTRACTION

SUSPENSION APPARATUS FOR VEHICLE

This is a 371 national phase application of PCT/JP2005/021077 filed 10 Nov. 2005, which claims priority of Japanese Patent Application No. 2004-339476 filed 24 Nov. 2004, the contents of which are incorporated herein by reference.

FIELD OF THE INVENTION

The present invention relates to a suspension apparatus for a vehicle constituted by including a so-called electromagnetic actuator.

BACKGROUND OF THE INVENTION

As a suspension apparatus for a vehicle, there has been considered a so-called electromagnetic suspension apparatus constituted by including an electromagnetic actuator which may be called "a suspension cylinder". Such a suspension apparatus is described in the following patent documents, for instance. The electromagnetic actuator of the suspension apparatus described in the patent documents includes: a wheel-side unit (which may be called "a wheel-side member") coupled to a wheel-holding portion such as a suspension lower arm for holding a wheel of the vehicle; a body-side unit (which may be called "a body-side member") coupled to a mount portion such as an upper portion of a tire housing that is formed at a part of a body of the vehicle. The wheel-side unit and the body-side unit are configured to be movable relative to each other in correspondence with a relative movement of the wheel-holding portion and the mount portion. The electromagnetic actuator further includes a relative-movement-directional-force generating mechanism for generating, by an electromagnetic motor, a relative-movement-directional force which is at least one of a propulsive force and a resistance force with respect to the relative movement of the wheel-side unit and the body-side unit. In the thus constructed suspension apparatus, it is possible to control a posture of the vehicle body and control a damping force generated by the suspension apparatus, by controlling the electromagnetic actuator. In the suspension apparatus described in the following patent documents, one of the wheel-side unit and the body-side unit is supported by the wheel-holding portion or mount portion via a hydraulic damper for improving ride comfort of the vehicle with respect to high-frequency vibrations transmitted from the wheel or abrupt vibrations that the actuator cannot follow or respond.

| [Paten Document 1] | JP-A-2001-180244 |
| [patent Document 2] | JP-A-8-197931 |

DISCLOSURE OF THE INVENTION

(A) Summary of the Invention

The hydraulic damper in the electromagnetic suspension apparatus described in the above-indicated patent documents has only a single function. In this respect, the suspension apparatus is not satisfactory in terms of improvement of the ride comfort of the vehicle. In the electromagnetic suspension apparatus described in the above-indicated Patent Document 2, the hydraulic damper is disposed between the motor as the body-side unit and the mount portion. Accordingly, the apparatus is not satisfactory in terms of mitigation of the vibration from the wheel. In the electromagnetic suspension apparatus described in the above-indicated Patent Document 1, the hydraulic damper is disposed between the electromagnetic actuator and the wheel-holding portion. In the apparatus, however, a seal portion between a housing of the hydraulic damper and a piston rod that extends from the housing is exposed or uncovered, so that there may be a risk of entry of dust, mud and the like into an interior of the housing through the seal portion. Thus, the apparatus is not satisfactory in terms of reliability. While there have been described some examples of problems that the conventional suspension apparatus experience, the conventional suspension apparatus equipped with the electromagnetic actuator and the hydraulic damper suffer from various problems. Accordingly, there is plenty of room to improve the utility of the apparatus. The present invention has been made in the light of the situations described above. It is therefore an object of the invention to provide a suspension apparatus for a vehicle equipped with the electromagnetic actuator and the hydraulic damper which assures high utility.

To achieve the object indicated above, a suspension apparatus for a vehicle according to the present invention is characterized by including: [1] an electromagnetic actuator including (a) a wheel-side unit coupled to a wheel-holding portion for holding a wheel of the vehicle, (b) a body-side unit which is coupled to a mount portion formed at a part of a body of the vehicle and which is movable relative to the wheel-side unit in correspondence with a relative movement of the wheel-holding portion and the mount portion, and (c) a relative-movement-directional-force generating mechanism which includes an electromagnetic power source and which generates a resistance force with respect to the relative movement of the wheel-side unit and the body-side unit; [2] a hydraulic damper including a housing which stores a working fluid, a piston which divides an interior of the housing into two fluid chambers, a flow-resistance imparting mechanism which imparts a resistance to a flow of the working fluid between the two fluid chambers associated with a movement of the piston, and a piston rod having a first end which is coupled to the piston and a second end which extends from the housing, the hydraulic damper being disposed between the wheel-holding portion and the electromagnetic actuator so as to be coaxial with the electromagnetic actuator, the housing being coupled to the wheel-holding portion while the second end of the piston rod being coupled to the wheel-side unit of the electromagnetic actuator, the hydraulic damper being configured to generate a damping force with respect to the relative movement of the wheel-holding portion and the electromagnetic actuator; [3] a suspension spring which is disposed between the wheel-holding portion and the mount portion and which is supported at one end thereof by the mount portion for supporting the wheel-holding portion and the mount portion relative to each other; [4] a support spring which is disposed between the wheel-side unit of the electromagnetic actuator and the wheel-holding portion for supporting the wheel-side unit and the wheel-holding portion relative to each other; and [5] a generally cylindrical cover tube which is disposed such that one end thereof is immovable relative to the wheel-holding portion while the other end thereof is movable relative to the body-side unit of the electromagnetic actuator, which accommodates therein at least a part of the piston rod of the hydraulic damper that extends from the housing and the support spring, and which includes a spring-supporting portion formed on an outer circumferential portion of the cover tube for supporting another end of the suspension spring opposite to said one end of the suspension spring.

In short, the suspension apparatus for a vehicle according to the present invention is characterized in that the hydraulic damper is disposed between the electromagnetic actuator and the wheel-holding portion and that the cover tube is provided to cover a seal portion between the piston rod and the housing of the hydraulic damper. In the present suspension apparatus wherein the hydraulic damper is disposed between the wheel-holding portion and the electromagnetic actuator, it is possible to effectively damp vibrations transmitted to the vehicle body from the wheel via the electromagnetic actuator. In addition, it is possible to effectively mitigate transmission of vibrations to the electromagnetic actuator. Further, owing to the cover tube, the entry of dust, mud and the like into the hydraulic damper through the seal portion can be effectively inhibited. In addition, because the cover tube functions as a support member for supporting the suspension spring, there is no need of additionally providing the supporting member, resulting in a simplified structure. The suspension apparatus according to the present invention assures high utility owing to various advantages mentioned above.

(B) Forms of Claimable Invention

There will be described in detail various forms of an invention which is considered claimable (hereinafter referred to as "claimable invention" where appropriate). Each of the forms of the claimable invention is numbered like the appended claims and depends from the other form or forms, where appropriate, for easier understanding of the claimable invention. It is to be understood that the invention is not limited to the technical features or any combinations thereof which will be described, and shall be construed in the light of the following descriptions of the various forms and preferred embodiments of the claimable invention. It is to be further understood that a plurality of elements or features included in any one of the following forms of the claimable invention are not necessarily provided all together, and that any form in which one or more elements or one or more features is/are added to any one of the following forms and any form in which one or more elements or one or more features is/are deleted from any one of the following forms may be considered one form of the claimable invention.

The form (1) indicated below is not the claimable invention, but is a form which lists constituent elements that are common to various forms of the claimable invention, namely, a form on which the claimable invention is based. Depending upon the objective, any forms in which the form (1) is combined with any one of, or any two or more of, the forms (2)-(29) are forms of the claimable invention. In this connection, a relationship between the following forms and the appended claims is as follows: A combination of the form (1) and the forms (3), (5), (6), (7), (9), (10), (14), (15), (16), (26), and (28), and a limitation relating to the electromagnetic actuator and the cover tube corresponds to claim 1. A combination of claim 1 and the form (4) corresponds to claim 3.

(1) A suspension apparatus for a vehicle comprising:

an electromagnetic actuator including (a) a wheel-side unit coupled to a wheel-holding portion for holding a wheel of the vehicle, (b) a body-side unit which is coupled to a mount portion formed at a part of a body of the vehicle and which is movable relative to the wheel-side unit in correspondence with a relative movement of the wheel-holding portion and the mount portion, and (c) a relative-movement-directional-force generating mechanism which includes an electromagnetic power source and which generates a relative-movement-directional force that is at least one of a propulsive force and a resistance force with respect to the relative movement of the wheel-side unit and the body-side unit, and a hydraulic damper for generating a damping force with respect to at least one of: a relative movement of a first portion which is one of the wheel-holding portion and the mount portion and a second portion which is the other of the wheel-holding portion and the mount portion; and a relative movement of the first portion and the electromagnetic actuator.

As explained above, the form (1) lists constituent elements that are common to various claimable inventions and has a significance as a form on which the claimable inventions are based. The suspension apparatus according to the form (1) is preferably of an independent suspension type and may include various types of suspension apparatus such as a strut type (MacPherson type), a double wishbone type, and a multi link type.

The "electromagnetic actuator" in the suspension apparatus according to the form (1) may be called "a suspension cylinder" and may correspond to a shock absorber or the like in an ordinary suspension system of a non-electromagnetic type, for instance. The "wheel-side unit" of the electromagnetic actuator is a portion which works in conjunction with the wheel-holding portion such as a suspension lower arm or a steering knuckle. The "body-side unit" is a portion which works in conjunction with the mount portion which is an attaching portion formed at the body of the vehicle such as an upper portion of a tire housing. The structures, the functions, etc., of the wheel-side unit and the body-side unit are not particularly limited. Where the electromagnetic actuator employs a ball screw mechanism as explained below, the wheel-side unit and the body-side unit may be constituted by including one and the other of an external thread member and an internal thread member or may be constituted principally by one and the other of the external thread member and the internal thread member. Since the wheel-side unit and the body-side unit are movable relative to each other, the wheel-side unit and the body-side unit may be configured to have a suitable guiding function for guiding the relative movement. More specifically described, the wheel-side unit and the body-side unit may be constituted by including one and the other of a tube and a rod or another tube inserted into the tube, whereby the electromagnetic actuator is configured to be telescopic. While the "relative-movement-directional-force generating mechanism" of the electromagnetic actuator is not particularly limited in construction, it may be constituted by including a ball screw mechanism which will be explained. As the "electromagnetic power source", an electromagnetic motor or the like may be employed, as explained below.

The "electromagnetic actuator" has the following two main functions. One of them may be called a passive function, namely, a function as a shock absorber which generates a damping force with respect to a movement of the wheel-holding portion and the mount portion toward and away from each other due to a force inputted from a road surface or the like, namely, a damping force with respect to vibrations. When the electromagnetic actuator exhibits this function, the relative-movement-directional-force generating mechanism generates mainly a resistance force to the relative movement of the wheel-side unit and the body-side unit. The magnitude of the resistance force is changed by controlling the electromagnetic power source, whereby the damping force can be adjusted as desired. Another function of the electromagnetic actuator may be called an active function of positively adjusting a distance between the wheel-holding portion and the mount portion for the purpose of adjusting a vehicle height, controlling a vehicle posture, etc. Explained more specifically, the function is for operating the electromagnetic actuator to change the posture of the vehicle body in an attempt to decrease a rolling amount, a pitching amount and the like of the vehicle body upon turning, braking and the like of the vehicle. When the electromagnetic actuator exhibits this function, the relative-movement-directional-force generating mechanism generates mainly a propulsive force with respect to the relative movement of the wheel-side unit and the body-side unit. By controlling the electromagnetic power source, the vehicle height, the vehicle posture, etc., can be adjusted as desired. In the form (1), it is possible to employ an electromagnetic actuator which exhibits both of the passive and the active functions described above or an electromagnetic actuator which exhibits only one of the passive and active functions.

The "hydraulic damper" in the form (1) may be provided mainly for damping relatively high-frequency vibrations. For instance, in the light of the passive function of the electromagnetic actuator, namely, the function as a shock absorber, the electromagnetic actuator is capable of damping vibrations by controlling the electromagnetic power source. It is, however, difficult to improve response to high-frequency vibrations. More specifically explained, because vibrations of not greater than 5 Hz such as a pitching vibration and a bouncing vibration have a relatively low vibration frequency, those vibrations can be effectively absorbed by controlling the electromagnetic power source. However, vibrations transmitted to the wheel from a road surface upon traveling of the vehicle on a rough road, namely, a so-called rough-road vibration, has a frequency of 15 Hz or higher. It is difficult for the electromagnetic actuator, in relation to response, to effectively absorb such high-frequency vibrations. Further, vibrations and unsprung resonance which are generated during traveling of the vehicle on a bumpy road surface having continuous bumps and dips have a frequency around 10 Hz. Such relatively high-frequency vibrations are hard to be sufficiently dealt with only by the electromagnetic actuator. The hydraulic damper can be employed for assuring absorption of such high-frequency or relatively high-frequency vibrations. In this instance, such a hydraulic damper assists the electromagnetic actuator. While the structure of the hydraulic damper is not particularly limited, the hydraulic damper may be constructed as a cylinder device having a housing, a piston and the like, as explained below.

A coupling arrangement of the hydraulic damper to the wheel-holding portion, the mount portion, and the electromagnetic actuator is not particularly limited. In the suspension apparatus according to the form (1), the coupling arrangements of the hydraulic damper shown in FIG. 1 may be employed. In FIG. 1, an electromagnetic actuator A having a wheel-side unit Mw and a body-side unit Mb and a suspension spring SS are disposed in parallel with each other and each of the electromagnetic actuator A and the suspension spring SS is configured to couple a wheel-holding portion Pw and a mount portion Pb to each other. In an arrangement shown in FIG. 1(a), a hydraulic damper Ds is disposed so as to couple the wheel-side unit Mw of the electromagnetic actuator A and the wheel-holding portion Pw to each other. In the arrangement of FIG. 1(a), a support spring Sb is disposed in parallel with the hydraulic damper Ds. In an arrangement shown in FIG. 1(b), a hydraulic damper Dp is disposed so as to couple the wheel-holding portion Pw and the mount portion Pb to each other. The hydraulic damper Ds in the arrangement of FIG. 1(a) is a damper disposed in series with the electromagnetic actuator A while the hydraulic damper Dp in the arrangement of FIG. 1(b) is a damper disposed in parallel with the electromagnetic actuator A. In addition, the suspension apparatus according to the form (1) is not limited to the one constituted by including a single hydraulic damper. As shown in an arrangement of FIG. 1(c), there may be provided two dampers, i.e., a hydraulic damper Ds disposed in series with the electromagnetic actuator A and a hydraulic damper Dp disposed in parallel with the electromagnetic actuator A. In FIG. 1, while the hydraulic damper Ds disposed in series with the electromagnetic actuator A is provided so as to couple the wheel-side unit Mw of the electromagnetic actuator A and the wheel-holding portion Pw to each other, the hydraulic damper Ds may be provided so as to couple the body-side unit Mb and the mount portion Pb to each other. FIG. 1 shows a concept relating to the coupling of the hydraulic damper and does not indicate actual positions of the hydraulic damper/dampers. As long as the coupling arrangements shown in FIG. 1 are employed, the hydraulic damper/dampers may be disposed anywhere.

The provision of the two hydraulic dampers having mutually different functions enables damping characteristics to the high-frequency vibrations to be appropriate. For instance, this advantage is offered by the arrangement of FIG. 1(c) in which the functions of the hydraulic dampers Ds, Dp respectively disposed in series with and in parallel with the electromagnetic actuator A are made different from each other. As explained above, the hydraulic damper Ds disposed in series with the electromagnetic actuator A works as a damper for effectively damping the high-frequency vibrations having a frequency exceeding 15 Hz while the hydraulic damper Dp disposed in parallel with the electromagnetic actuator A works as a damper for effectively damping the relatively high-frequency vibrations having a frequency around 10 Hz.

The term "couple" used in the present specification means not only direct connection but also indirect connection in which elements are connected indirectly to each other with a certain component, member, device or the like interposed therebetween. For instance, where the wheel-side unit and the body-side unit are coupled to the wheel-holding portion and the mount portion, respectively, those units may be coupled directly to the wheel-holding portion and the mount portion or indirectly to the wheel-holding portion and the mount portion via the hydraulic damper interposed therebetween.

(2) The suspension apparatus according to the above form (1), wherein the relative-movement-directional-force generating mechanism of the electromagnetic actuator includes: an external thread portion which is provided in one of the wheel-side unit and the body-side unit immovably relative thereto; an internal thread portion which is provided in the other of the wheel-side unit and the body-side unit immovably relative thereto and which engages the external thread portion; and an electromagnetic motor as an electromagnetic power source for applying a relative rotational force to the external thread portion and the internal thread portion, and wherein the relative-movement-directional-force generating mechanism is configured to generate the relative-movement-directional force by the relative rotational force applied by the motor.

In short, the form (2) relates to an electromagnetic actuator that employs a screw mechanism. Where the electromagnetic actuator, namely, the relative-movement-directional-force generating mechanism, is constituted employing the screw mechanism, the electromagnetic actuator can be simplified. In view of friction and the like of the screw mechanism, it is preferable to employ a ball screw mechanism. Each of the external thread portion and the internal thread portion may be provided in either of the wheel-side unit and the body-side unit. Where the wheel-side unit and the body-side unit are unrotatable relative to the wheel-holding portion and the mount portion, respectively, either one of the external thread portion and the internal thread portion may be made rotatable relative to either one of the wheel-side unit and the body-side unit in which the above-indicated either one of the external thread portion and the internal thread portion is provided. Where either one of the wheel-side unit and the body-side unit is rotatable relative to the wheel-holding portion or the mount portion, each of the external thread portion and the internal thread portion may be made unrotatable relative to each of the wheel-side unit and the body-side unit in which each of the external thread portion and the internal thread portion is provided. While the electromagnetic motor is configured, in the form (2), to apply a relative rotational force to the external thread portion and the internal thread portion, the electromagnetic motor may be configured to apply a rotational force to the external thread portion or the internal thread portion. Where the electromagnetic motor is configured to apply the rotational force to the external thread portion or the internal thread portion provided in the wheel-side unit, the electromagnetic motor may be disposed on at least one of the wheel-side unit and the wheel-holding portion. On the contrary, where the electromagnetic motor is configured to apply the rotational force to the external thread portion or the internal thread portion provided in the body-side unit, the electromagnetic motor may be disposed on at least one of the body-side unit and the mount portion.

(3) The suspension apparatus according to the above form (1) or (2), comprising a suspension spring disposed between the wheel-holding portion and the mount portion.

The form (3) includes a suspension spring which is provided in an ordinary suspension apparatus, for instance. It is possible to suitably maintain a distance by which the wheel-holding portion and the mount portion are apart from each other, by the above-indicated relative-movement-directional force generated by the electromagnetic actuator. To this end, however, it is required to continuously supply electric energy to the electromagnetic power source, rendering the apparatus impractical. In this respect, the form (3) is practical.

(4) The suspension apparatus according to the above form (3), wherein the suspension spring is a coil spring and the electromagnetic actuator is disposed so as to penetrate the coil spring.

The form (4) includes an arrangement in which the electromagnetic actuator is disposed at a location where a shock absorber is disposed in an ordinary suspension apparatus, for instance. The suspension apparatus according to the form (4) has a structure similar to that of a widely used suspension apparatus, assuring a high utility.

(5) The suspension apparatus according to any one of the above forms (1)-(4), wherein the hydraulic damper is disposed between the first portion and the electromagnetic actuator.

In the form (5), the position of the hydraulic damper is limited. It is noted that the form (5) does not limit the coupling arrangement of the hydraulic damper to the wheel-holding portion, the mount portion, and the electromagnetic actuator explained above. More specifically explained, the above-indicated hydraulic damper disposed in parallel with the electromagnetic actuator may be disposed between the wheel-holding portion or the mount portion and the electromagnetic actuator. By thus disposing the hydraulic damper, the suspension apparatus can be relatively simplified.

(6) The suspension apparatus according to the above form (5), wherein the hydraulic damper is disposed between the wheel-holding portion as the first portion and the electromagnetic actuator.

In the form (6), the hydraulic damper is disposed at a location nearer to the wheel, as compared with the case where the hydraulic damper is disposed between the mount portion and the electromagnetic actuator. Accordingly, the form (6) offers an advantage that the vibration from the wheel is not likely to be transmitted to the electromagnetic actuator. Where the electromagnetic motor is employed as the electromagnetic power source, for instance, the vibration to be transmitted to the motor is effectively damped. Accordingly, the form (6) realizes the suspension apparatus with high reliability.

(7) The suspension apparatus according to any one of the above forms (1)-(6), wherein the hydraulic damper and the electromagnetic actuator are disposed coaxially with each other.

Where the electromagnetic actuator and the hydraulic damper are disposed coaxially with each other as in the form (7), it is possible to minimize an amount of projection of the hydraulic damper in a direction intersecting the axial direction that generally corresponds to a direction in which a straight line connecting the wheel-holding portion and the mount portion extends, so that the suspension apparatus can be made relatively compact in size.

(8) The suspension apparatus according to any one of the above forms (1)-(7), wherein the electromagnetic power source of the electromagnetic actuator is provided in at least one of the body-side unit and the mount portion.

The form (8) enables the electromagnetic power source to be disposed at a location distant from the wheel. Accordingly, by appropriately disposing the relative-movement-rotational-force generating mechanism, the hydraulic damper, etc., the vibration transmitted from the wheel to the power source can be made relatively small. The form (8) is particularly effective when the electromagnetic power source is an electromagnetic motor. Therefore, the vibration transmitted from the wheel to the motor can be relatively easily mitigated with high efficiency, so that the suspension apparatus with high reliability can be relatively easily realized.

(9) The suspension apparatus according to any one of the above forms (1)-(8), wherein the hydraulic damper is configured to generate a damping force with respect to the relative movement of the first portion and the electromagnetic actuator.

In the form (9), the electromagnetic actuator and the hydraulic damper are disposed in series with each other as in the arrangement shown in FIG. 1(a), for instance. The form (9) realizes the suspension apparatus capable of effectively absorbing the high-frequency vibrations transmitted from the wheel to the vehicle body, as explained above. Such suspension apparatus can improve the ride comfort of the vehicle, for instance.

(10) The suspension apparatus according to the above form (9), comprising a support spring disposed between the first portion and the electromagnetic actuator for supporting the first portion and the electromagnetic actuator relative to each other.

In the form (10), a spring is disposed in parallel with the hydraulic damper in an arrangement in which the hydraulic damper and the electromagnetic actuator are disposed in series with each other. More specifically, the arrangement shown in FIG. 1(a) is included in the form (10). Owing to the function of the support spring, effective vibration absorption is ensured. The "support spring" employed in the form (10) may have any structure. For, instance, a coil spring may be employed. In this instance, the coil spring may be disposed such that the hydraulic damper penetrates the coil spring, whereby the suspension apparatus can be made compact in size.

(11) The suspension apparatus according to any one of claims 1-5, wherein the hydraulic damper is configured to generate a damping force with respect to the relative movement of the first portion and the second portion.

In the form (11), the electromagnetic actuator and the hydraulic damper are disposed in parallel with each other as in the arrangement shown in FIG. 1(*b*), for instance. The form (11) realizes the suspension apparatus capable of absorbing the relatively high-frequency vibrations to which the electromagnetic actuator cannot sufficiently respond. Such suspension apparatus can improve the ride comfort of the vehicle, for instance.

(12) The suspension apparatus according to any one of the above forms (1)-(11), which is constituted by including, each as the hydraulic damper, a first hydraulic damper for generating a damping force with respect to the relative movement of the electromagnetic actuator and the first portion and a second hydraulic damper for generating a damping force with respect to the second portion and the first portion.

In the form (12), two hydraulic dampers are provided as in the arrangement shown in FIG. 1(*c*), i.e., a hydraulic damper disposed in series with the electromagnetic actuator and a hydraulic damper disposed in parallel with the electromagnetic actuator. According to the form (12) wherein the two hydraulic dampers having mutually different functions are provided, various vibration absorption characteristics can be achieved. Thus, the form (12) realizes the suspension apparatus that assures effective vibration absorption.

(13) The suspension apparatus according to the above form (12), which is constituted by comprising, as the hydraulic damper, one hydraulic damper in which the first hydraulic damper and the second hydraulic damper are integral with each other.

In the form (13), the above-indicated two hydraulic dampers are made integral with each other, thereby realizing the suspension apparatus which is compact in size. While a specific structure for integrating the two hydraulic dampers is not particularly limited, there will be discussed later an integral structure in a case where each hydraulic damper is constituted as a cylinder device.

(14) The suspension apparatus according to the above forms (1)-(13), wherein the hydraulic damper includes: a housing which stores a working fluid; a piston which divides an interior of the housing into two fluid chambers; a flow-resistance imparting mechanism which imparts a resistance to a flow of the working fluid between the two fluid chambers associated with a movement of the piston; and a piston rod having a first end which is coupled to the piston and a second end which extends from the housing, wherein (A) one of the housing and the second end of the piston rod is coupled to (B) one of (i) at least one of the electromagnetic actuator and the second portion and (ii) the first portion, and wherein (C) the other of the housing and the second end of the piston rod is coupled to (D) the other of (i) at least one of the electromagnetic actuator and the second portion and (ii) the first portion.

In the form (14), the hydraulic damper is limited to a hydraulic cylinder device. More specifically explained, the form (14) includes an arrangement in which the hydraulic damper has a structure similar to that of a hydraulic shock absorber. The "flow-resistance imparting mechanism" in the form (14) may be constituted by an orifice, a restrictor or a throttle valve, etc. provided in the piston that defines the two fluid chambers. Where a buffer chamber is formed for absorbing changes in the storage amounts of the working fluid in the two fluid chambers associated with a movement of the piston, the flow-resistance imparting mechanism may be constituted by the orifice, the restrictor or the throttle valve provided in a fluid passage between the buffer chamber and at least one of the two fluid chambers. Though the hydraulic damper is disposed between the electromagnetic actuator and the wheel-holding portion or the mount portion in the form (14), a variety of coupling arrangements between the housing and the second end of the piston rod may be employed. Concrete arrangements relating to the coupling will be explained in the following forms.

(15) The suspension apparatus according to the above form (14), wherein (A) said one of the housing and the second end of the piston rod is coupled to the wheel-holding portion as (B) said one of (i) at least one of the electromagnetic actuator and the second portion and (ii) the first portion, and wherein (C) the other of the housing and the second end of the piston rod is coupled to at least one of the electromagnetic actuator and the mount portion as (D) the other of (i) at least one of the electromagnetic actuator and the second portion and (ii) the first portion.

In the form (15), the hydraulic damper constituted as the cylinder device is disposed between the wheel-holding portion and the electromagnetic actuator. As explained above, the form (15) realizes the suspension apparatus with a simplified structure. In addition, because the hydraulic damper is disposed at a location near to the wheel, the vibrations from the wheel are not likely to be transmitted to the electromagnetic actuator.

(16) The suspension apparatus according to the above form (14) or (15), wherein the housing as (A) said one of the housing and the second end of the piston rod is coupled to (B) said one of (i) at least one of the electromagnetic actuator and the second portion and (ii) the first portion, and wherein the second end of the piston rod as (C) the other of the housing and the second end of the piston rod is coupled to (D)

the other of (i) at least one of the electromagnetic actuator and the second portion and (ii) the first portion.

In the form (16), the housing is coupled to one of the wheel-holding portion and the mount portion while the second end of the piston rod is coupled to at least one of: the other of the wheel-holding portion and the mount portion to which the housing is not coupled; and the electromagnetic actuator.

(17) The suspension apparatus according to any one of the above forms (14)-(16), wherein (C) the other of the housing and the second end of the piston rod is coupled to (E) one of the wheel-side unit and the body-side unit coupled to the first portion, as (D) the other of (i) at least one of the electromagnetic actuator and the second portion and (ii) the first portion.

In the form (17), the hydraulic damper constituted as the cylinder device is disposed in series with the electromagnetic actuator, as explained above. The form (17) enjoys the advantages explained above with respect to the form in which the electromagnetic actuator and the hydraulic damper are formed in series with each other.

(18) The suspension apparatus according to the above form (17), comprising a support spring which is disposed between: (E) said one of the wheel-side unit and the body-side unit coupled to the first portion; and the first portion, for supporting (E) said one of the wheel-side unit and the body-side unit coupled to the first portion and the first portion relative to each other.

In the form (18), a spring is disposed in parallel with the hydraulic damper in the above-indicated form wherein the electromagnetic actuator and the hydraulic damper are disposed in series with each other. The form (18) enjoys the advantages described above with respect to the support spring.

(19) The suspension apparatus according to any one of the above forms (14)-(16), wherein (C) the other of the housing and the second end of the piston rod is coupled to at least one of: the second portion; and the other of the wheel-side unit and the body-side unit coupled to the second portion, as (D) the other of (i) at least one of the electromagnetic actuator and the second portion and (ii) the first portion.

In the form (19), the hydraulic damper constituted as the cylinder device is disposed in parallel with the electromagnetic actuator, as explained above. The form (19) enjoys the advantages described with respect to the above-indicated form wherein the electromagnetic actuator and the hydraulic damper are disposed in parallel with each other.

(20) The suspension apparatus according to the above form (14),
wherein the wheel-side unit and the body-side unit of the electromagnetic actuator are configured to be unrotatable relative to each other,
wherein the relative-movement-directional-force generating mechanism of the electromagnetic actuator includes: (c-1) a rod which is rotatably provided in the body-side unit so as to constitute a part of the body-side unit and which is formed with an external thread so as to function as an external thread portion; (c-2) a nut which constitutes at least a part of the wheel-side unit and which is formed with an internal thread so as to function as an internal thread portion that engages the rod; and (c-3) an electromagnetic motor which is provided in at least one of the body-side unit and the mount portion and which functions as the electromagnetic power source for applying a rotational force to the rod, the relative-movement-directional-force generating mechanism being configured to generate the relative-movement-directional force by the rotational force applied by the electromagnetic motor,
wherein the housing as (A) said one of the housing and the second end of the piston rod is coupled to the wheel-holding portion as (B) said one of (i) at least one of the electromagnetic actuator and the second portion and (ii) the first portion, and
wherein the second end of the piston rod as (C) the other of the housing and the second end of the piston rod is coupled to the rod as (D) the other of (i) at least one of the electromagnetic actuator and the second portion and (ii) the first portion.

In the form (20), a screw mechanism is employed for the electromagnetic actuator, and a rotatable rod as the external thread portion is provided in the body-side unit. In such a form, a leading end of the rod that partially constitutes the body-side unit is coupled to the second end of the piston rod of the hydraulic damper constituted as the cylinder device. In the form, the hydraulic damper and the electromagnetic actuator can be disposed in parallel with each other when the hydraulic damper is disposed between one of the wheel-holding portion and the mount portion and the electromagnetic actuator and when the electromagnetic actuator and the hydraulic damper are disposed coaxially with each other. In such a case, the suspension apparatus having a simplified structure can be realized.

(21) The suspension apparatus according to the above form (20), comprising a rod•piston-relative-rotation permitting mechanism for permitting a relative rotation of the rod of the electromagnetic actuator and the piston of the hydraulic damper.

In the above-indicated form wherein the rod and the second end of the piston rod are coupled to each other, the rod rotates. Accordingly, where the rod and the second end of the piston rod are coupled directly to each other, the piston may rotate relative to the housing, for instance. The rotation of the piston relative to the housing may be a factor that hinders a smooth movement of the piston in the housing and a factor that deteriorates the durability of the hydraulic damper. The form (21) is particularly effective to deal with such undesirable factors. Owing to the rod•piston-relative-rotation permitting mechanism, the suspension apparatus in which the relative rotation of the housing and the piston is not required is realized. As a result, the smooth movement of the piston in the housing is ensured and the durability of the hydraulic damper is improved, for instance. The structure of the "rod•piston-relative-rotation permitting mechanism" is not specifically limited, but any structure may be employed. When the friction resistance or the like is taken into consideration, it is desirable to employ a structure including a bearing or the like, as explained below.

(22) The suspension apparatus according to the above form (20) or (21), wherein the rod of the electromagnetic actuator and the piston rod of the hydraulic damper are integral with each other.

In the form (22), the rod and the second end of the piston rod which are coupled to each other are integrated. According to the form (22), the piston rod of the hydraulic damper and the rod of the electromagnetic actuator are made as one component, whereby the suspension apparatus has a simplified structure.

(23) The suspension apparatus according to the above form (22),
wherein the piston rod and the piston are coupled to each other via a bearing which functions as the rod•piston-relative-rotation permitting mechanism for permitting the relative rotation of the rod and the piston.

According to the form (23), the piston and the piston rod are coupled to each other via a bearing interposed therebetween in the above-indicated form in which the piston rod and the rod are integrated. By employing the bearing as the rod•piston-relative-rotation permitting mechanism, it is possible to realize, with a simplified structure, the suspension apparatus that does not require the relative rotation of the hydraulic damper and the piston.

(24) The suspension apparatus according to the above form (14),
wherein the hydraulic damper includes: the housing having two working-fluid storing portions that store a working fluid; a first piston and a second piston each of which divides a corresponding one of the two working-fluid storing portions into two fluid chambers; a first flow-resistance imparting mechanism and a second flow-resistance imparting mechanism each of which imparts a resistance to a flow of the working fluid between the two chambers of a corresponding one of the two working-fluid storing portions associated with a movement of a corresponding one of the first piston and the second piston; and a first piston rod and a second piston rod each having a first end which is coupled to a corresponding one of the first piston and the second piston and a second end which extends from the housing,
wherein the housing as (A) said one of the housing and the second end of the piston rod is coupled to the first portion as (B) said one of (i) at least one of the electromagnetic actuator and the second portion and (ii) the first portion while one of the second end of the first piston rod and the second end of the second piston rod as (C) the other of the housing and the second end of the piston rod is coupled to (E) one of the wheel-side unit and the body-side unit coupled to the first portion, as (D) the other of (i) at least one of the electromagnetic actuator and the second portion and (ii) the first portion, and wherein the other of the second end of the first piston rod and the second end of the second piston rod as (C) the other of the housing and the second end of the piston rod is coupled to at least one of: the second portion; and the other of the wheel-side unit and the body-side unit coupled to the second portion, as (D) the other of (i) at least one of the electromagnetic actuator and the second portion and (ii) the first portion, and wherein the suspension apparatus is constituted by comprising a support spring which is disposed between: the first portion; and (E) said one of the wheel-side unit and the body-side unit coupled to the first portion, for supporting the first portion and (E) said one of the wheel-side unit and the body-side unit coupled to the first portion relative to each other.

According to the form (24), the above-indicated first hydraulic damper and second hydraulic damper are integrated into one cylinder device in the form in which the hydraulic damper is constituted as the cylinder device. More specifically explained, in the form (24), the hydraulic damper disposed in series with the electromagnetic actuator and the hydraulic damper disposed in parallel with the electromagnetic actuator in the arrangement schematically shown in FIG. 1(c) are constituted by one cylinder device. The form (24) enjoys the advantages explained above with respect to the form in which are provided the two hydraulic dampers that are respectively disposed in series with and in parallel with the electromagnetic actuator and the advantages explained above with respect to the form in which those two hydraulic dampers are integrated.

(25) The suspension apparatus according to the above form (24), wherein the hydraulic damper is configured such that the first piston and the second piston are arranged in a direction in which the two working-fluid storing portions are aligned with each other and such that one of the first piston rod and the second piston rod is hollow for permitting the other of the first piston rod and the second piston rod to penetrate therethrough.

The form (25) relates to a concrete structure for realizing, in the form in which the two hydraulic dampers are constituted as one cylinder device, that a portion of the above-indicated one cylinder functioning as the first hydraulic damper and a portion of the same functioning as the second hydraulic damper are disposed coaxially with each other. According to the form (25), the hydraulic damper having mutually different functions can be made compact.

(26) The suspension apparatus according to any one of the above forms (14)-(25), which is constituted by including a generally cylindrical cover tube for accommodating therein at least a part of the piston rod of the hydraulic damper that extends from the housing.

Where the hydraulic damper is constituted as the cylinder device, it is usual to attach a seal to a boundary between the housing and a portion of the piston rod extending from the housing, for the purpose of preventing leakage of the working fluid. Since the present suspension apparatus is installed in the tire housing or the like, the suspension apparatus is subjected to a condition in which large amounts of dust, mud and the like adhere thereto. Therefore, there may be a possibility that the dust, mud and the like adhere to the seal and enter the interior of the housing passing through the seal in some instances. The form (26) considers such a possibility. According to the form (26), owing to the cover tube indicated above, the dust, mud and the like are effectively prevented from adhering to the seal portion. To prevent entry of the dust and the like through a spacing or clearance between the cover tube and other components such as the housing of the hydraulic damper, the electromagnetic actuator, the wheel-holding portion, and the mount portion, it is desirable to provide a seal member in the spacing. Where those components and the cover tube move relative to each other in association with the relative movement of the wheel-holding portion and the mount portion, the seal member is preferably configured to permit the relative movement of the components and the cover tube. Further, there may be a possibility that the piston rod is damaged due to impingement of pebbles and the like thereupon that are thrown up by the wheel. In consideration of such a possibility, the cover tube is preferably made of metal.

(27) The suspension apparatus according to the above form (26), wherein (C) the other of the housing and the second end of the piston rod is coupled to (E) said one of the wheel-side unit and the body-side unit coupled to the first portion, as (D) the other of (i) at least one of the electromagnetic actuator and the second portion and (ii) the first portion, and wherein the suspension apparatus is constituted by comprising a support spring which is disposed between: the first portion; and (E) said one of the wheel-side unit and the body-side unit connected to the first portion, for supporting the first portion and (E) said one of the wheel-side unit and the body-side unit connected to the first portion relative to each other, and wherein the cover tube is configured to accommodate the support spring.

When the electromagnetic actuator and the hydraulic damper are disposed in series with each other, the above-indicated support spring is disposed in parallel with the hydraulic damper in some cases. Where the support spring is a coil spring, the suspension spring often needs to be made of a wire having a smaller wire diameter, as compared with the suspension spring as a main constituent element in the suspension apparatus, due to a limitation in the installation space of the support spring, etc. As mentioned above, since the suspension apparatus is installed in the tire housing or the like, there may be a possibility that the support spring is damaged due to impingement of pebbles and the like thereupon that are thrown up by the wheel. The form (27) takes such a possibility into consideration. According to the form (27), owing to the cover tube, the support spring is effectively prevented from being damaged. The form (27) is particularly effective in an arrangement wherein the support spring is the coil spring and the hydraulic damper is disposed in the coil spring.

(28) The suspension apparatus according to the above form (26) or (27), wherein the cover tube is disposed such that one end thereof is immovable relative to the first portion while the other end thereof is movable relative to one of the wheel-side unit and the body-side unit that is coupled to the second portion.

The form (28) includes an arrangement in which the cover tube is fixed to the wheel-holding portion or the mount portion and an arrangement in which the cover tube is fixed to the housing of the hydraulic damper when the housing is coupled to the wheel-holding portion or the mounting portion immovably relative thereto. Owing to such arrangements, the cover tube can be firmly disposed.

(29) The suspension apparatus according to the above form (28), which is constituted by comprising a coil spring as a suspension spring that is disposed between the wheel-holding portion and the mount portion with the electromagnetic actuator penetrating the coil spring, wherein the cover tube includes a spring-supporting portion (160) which is formed on an outer circumferential portion thereof for supporting one end of the coil spring that is coupled to the first portion.

In the form (29), the cover tube functions as a supporting member for supporting the suspension spring. The form (29) is effective when the cover tube is made of metal, for instance. The form (29) eliminates a need of additionally providing the supporting member for supporting the suspension spring, so that the suspension apparatus with a simplified structure is realized.

DETAILED DESCRIPTION

Figure 1:
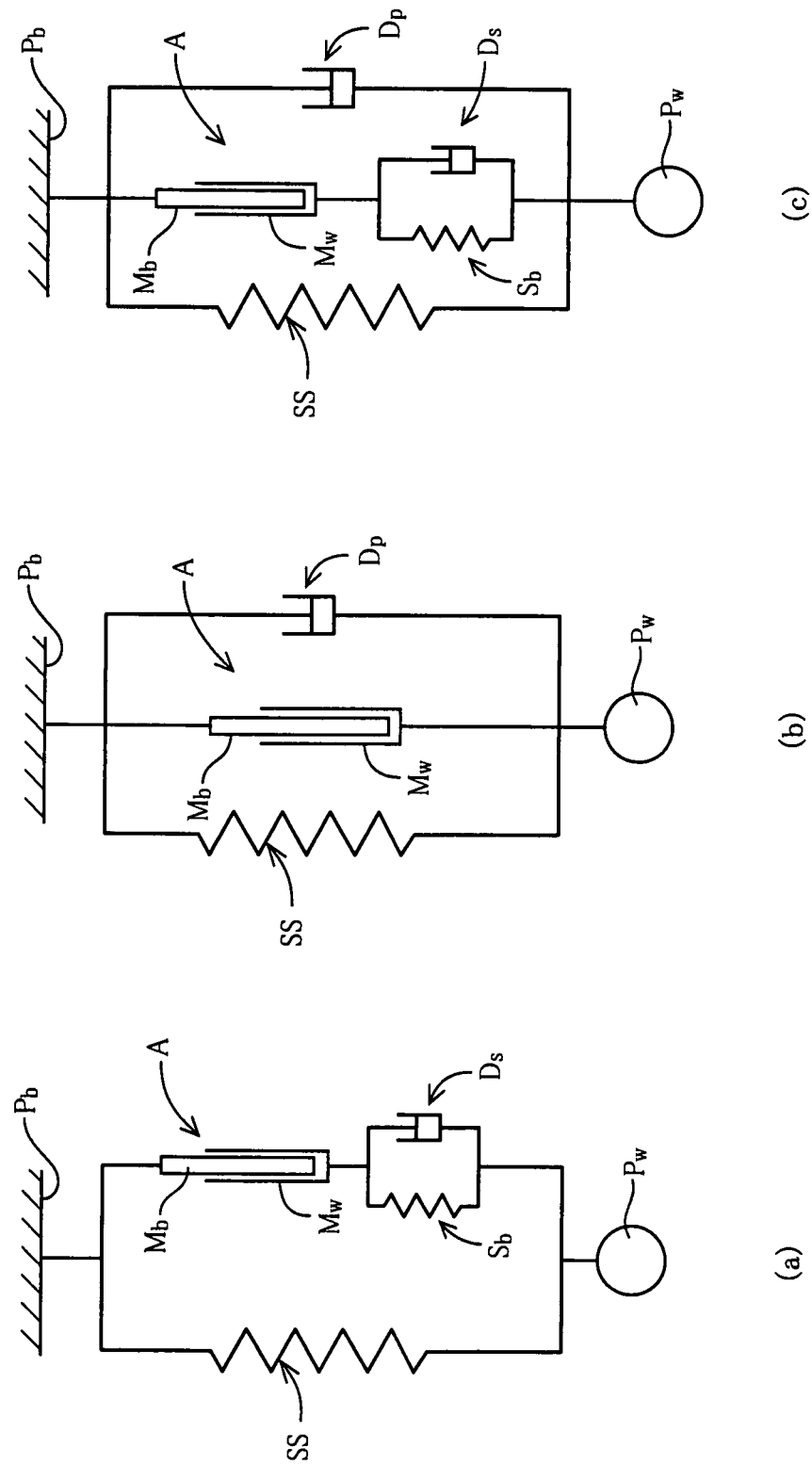
FIG. 1 is a schematic view illustrating coupling arrangements of a hydraulic damper that can be employed in a suspension apparatus for a vehicle according to the present invention.

There will be described in detail some embodiments of the present invention, referring to the drawings. It is to be understood, however, that the invention is not limited to the following embodiments but may be embodied with various changes and modifications, such as those described in the FORMS OF THE CLAIMABLE INVENTION, which may occur to those skilled in the art.

1. First Embodiment

Figure 2:
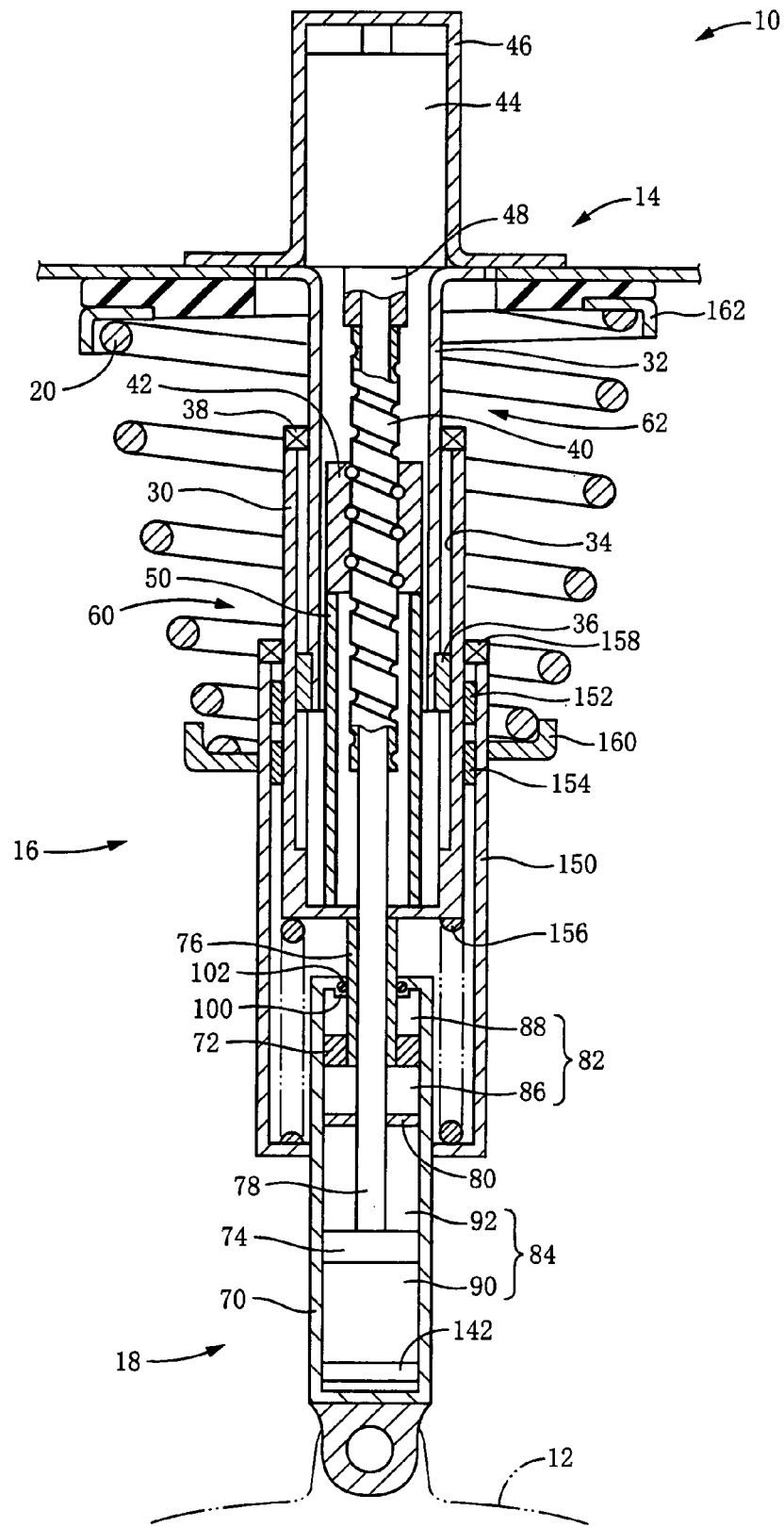
FIG. 2 is a front elevation in cross section showing a suspension apparatus for a vehicle according to a first embodiment.

FIG. 2 shows a suspension apparatus 10 for a vehicle according to one embodiment of the present invention. The suspension apparatus 10 is of an independent suspension type and is provided for each of a front right wheel, a front left wheel, a rear right wheel, and a rear left wheel. Each suspension apparatus 10 is disposed between: a suspension lower arm (hereinafter abbreviated as "lower arm" where appropriate) 12 which is a wheel-holding member for holding a corresponding wheel and which functions as a first portion; and a mount portion 14 which is formed at a part of a body of the vehicle (such as an upper portion of a tire housing) and which functions as a second portion. The present suspension apparatus 10 is constituted by including an actuator cylinder 16 as an electromagnetic actuator, a damper cylinder 18 as a hydraulic damper, and a coil spring 20 as a suspension spring. The suspension apparatus 10 is configured such that a vibration of the vehicle body generated by expansion and contraction of the spring 20 is damped by the actuator 16 and the damper cylinder 18. The actuator cylinder 16 has not only a passive function as a shock absorber that generates a damping force with respect to the vibration, but also an active function of actively adjusting a distance between the lower arm 12 and the mount portion 14 for the purpose of adjusting a vehicle height, controlling a vehicle posture, etc.

The actuator cylinder 16 is constituted by including an outer tube 30 and inner tube 32 which is fitted into the outer tube 30 so as to protrude upward from an upper end of the outer tube 30. As will be explained below in detail, the outer tube 30 is coupled at its lower end to the lower arm 12 via the damper cylinder 18 while the inner tube 32 is coupled at its upper end to an underside of the mount portion 14. The outer tube 30 has a pair of guide grooves 34 formed on its inner wall surface so as to extend in its axial direction. Into the guide grooves 34 of the outer tube 30, a pair of keys 36 formed at a lower end of the inner tube 32 are fitted, whereby the outer tube 30 and the inner tube 32 are configured to be unrotatable and axially movable relative to each other. At the upper end of the outer tube 30, a seal 38 is provided for preventing entry of dust, mud and the like from an exterior.

The actuator cylinder 16 is constituted by including a hollow rod 40 (hereinafter referred to as "rod 40" where appropriate) on which is formed an external thread, a nut 42 holding bearing balls and engaging the rod 40, and an electromagnetic motor 44 (hereinafter referred to as "motor 44" where appropriate). The motor 44 is fixedly housed in the motor casing 46. A flange portion of the motor casing 46 is fixed to an upper surface of the mount portion 14, whereby the motor 44 is fixed to the mount portion 14. To the flange portion of the motor casing 46, the upper end of the inner tube 32 is also fixed. According to this structure, the inner tube 32 is fixed to the mount portion 14. A motor shaft 48 which is a rotational shaft of the motor 44 is a hollow shaft and connected integrally to an upper end of the rod 40. That is, the rod 40 is disposed in the inner tube 32 as if the motor shaft 48 is extended and the rod 40 is configured to be rotated by the motor 44. The nut 42 is fixed to an upper end of a supporting tube 50 that is fixed to an inner bottom surface of the outer tube 30 so as to extend upright therefrom. In this state, the nut 42 is held in engagement with the rod 40.

As described above, the actuator cylinder 16 is configured such that a wheel-side unit 60 is constituted by including the outer tube 30, the nut 42, and the supporting tube 50 while a body-side unit 62 is constituted by including the inner tube 32, the rod 40, the motor 44, and the motor casing 46. The wheel-side unit 60 is coupled to the suspension lower arm 12 via the damper cylinder 18 and the body-side unit 62 is coupled to the mount portion 14. The rod 40 and the nut 42 cooperate with each other to constitute a ball screw mechanism and respectively function as an external thread portion provided in the body-side unit 62 and an internal thread portion provided in the wheel-side unit 60.

In the thus constructed actuator cylinder 16, where the part of the vehicle body and the wheel move relative to each other, the rod 40 and the nut 42 can be moved relative to each other in an axial direction while involving rotation of the rod 40 relative to the nut 42, together with rotation of the motor shaft 48. That is, as the part of the vehicle body and the wheel move toward and away from each other, the wheel-side unit 60 and the body-side unit 62 can be moved relative to each other. With application of a rotational torque to the rod 40 by operating the motor 44, a relative rotational torque can be applied to the nut 42 and the external thread formed on the rod 40. By making a direction and a magnitude of the relative rotational torque appropriate, it is possible to generate a proper resistance force in a direction in which the relative movement of the wheel-side unit 60 and the body-side unit 62 is inhibited, against the relative movement. This resistance force corresponds to a damping force with respect to the relative movement of the part of the vehicle body and the wheel. While such a damping-force generating function of the actuator cylinder 16 may be considered to be passive, the actuator cylinder 16 can be operated actively as explained above. That is, it is possible to permit the actuator cylinder 16 to exhibit a function of stabilizing the posture of the vehicle and a function of adjusting the height of the vehicle, by positively moving the wheel-side unit 60 and the body-side unit 62 relative to each other by rotation of the motor 44. In this instance, by controlling the motor 44, there is generated a propulsive force with respect to the relative movement of the wheel-side unit 60 and the body-side unit 62. Thus, the actuator cylinder 16 is equipped with a relative-movement-directional-force generating mechanism for generating a relative-movement-directional force which is at least one of the resistance force and the propulsive force with respect to the relative movement of the wheel-side unit 60 and the body-side unit 62. The relative-movement-directional-force generating mechanism is constituted by including the external thread portion of the rod 40, the nut 42 as the internal thread portion, and the motor 44 as an electromagnetic power source.

The damper cylinder 18 will be explained referring also to FIG. 3. The damper cylinder 18 is disposed between the actuator cylinder 16 and the lower arm 12 and constituted by including: a housing 70 coupled to the lower arm 12 and storing a working fluid; a first piston 72 and a second piston 74 which are fluid-tightly and slidably fitted in an interior of the housing 70; and a first piston rod 76 and a second piston rod 78 each of which has a lower end (as a first end) coupled to a corresponding one of the first and second pistons 72, 74 and an upper end (as a second end) extending upward from the housing 70. The interior of the housing 70 is divided by a partition wall 80 into two working-fluid storing portions aligned with each other in an upward and downward direction, i.e., a first working-fluid storing portion 82 and a second working-fluid storing portion 84. The first and second pistons 72, 74 are respectively fitted in the first and second working-fluid storing portions 82, 84. The first working-fluid storing portion 82 is divided into a lower chamber 86 and an upper chamber 88 while the second working-fluid chamber 84 is divided into a lower chamber 90 and an upper chamber 92.

The first piston rod 76 is a hollow piston rod while the second piston rod 78 is inserted through the first piston rod 76 so as to extend from the housing 70. The first piston rod 76 is fixedly coupled at the upper end thereof to the lower end of the outer tube 30. The second piston rod 78 penetrates the rod 40 and the motor 44, specifically, the motor shaft 48, and is coupled to an upper portion of the motor casing 46 which partially constitutes the body-side unit 62. An inner peripheral portion of an inward flange 100 formed on an upper portion of the housing 70 and an outer peripheral portion of the first piston rod 76 are held in sliding contact with each other via a seal 102, thereby preventing leakage of the working fluid. The second piston rod 78 and the partition wall 80 are held in sliding contact with each other via a seal 104 while the second piston rod 78 and the first piston rod 76 are held in sliding contact with each other via a seal 106. Thus, the fluid tightness of the working-fluid chambers is maintained.

More specifically explained, the damper cylinder 18 has a structure similar to that of a shock absorber of a twin-tube type. The housing 70 is comprised of an outer cylindrical member 110 and an inner cylindrical member 112 between which a buffer chamber 114 is formed. The first piston 72 and the second piston 74 are fluid-tightly and slidably fitted in the inner cylindrical member 112. The damper cylinder 18 is equipped with flow-resistance imparting mechanisms for imparting a resistance to a flow of the fluid between the lower and upper chambers 86, 88 and a flow of the fluid between the lower and upper chambers 90, 92 associated with the movement of the first piston 72 and the movement of the second piston 74, respectively.

Figure 3:
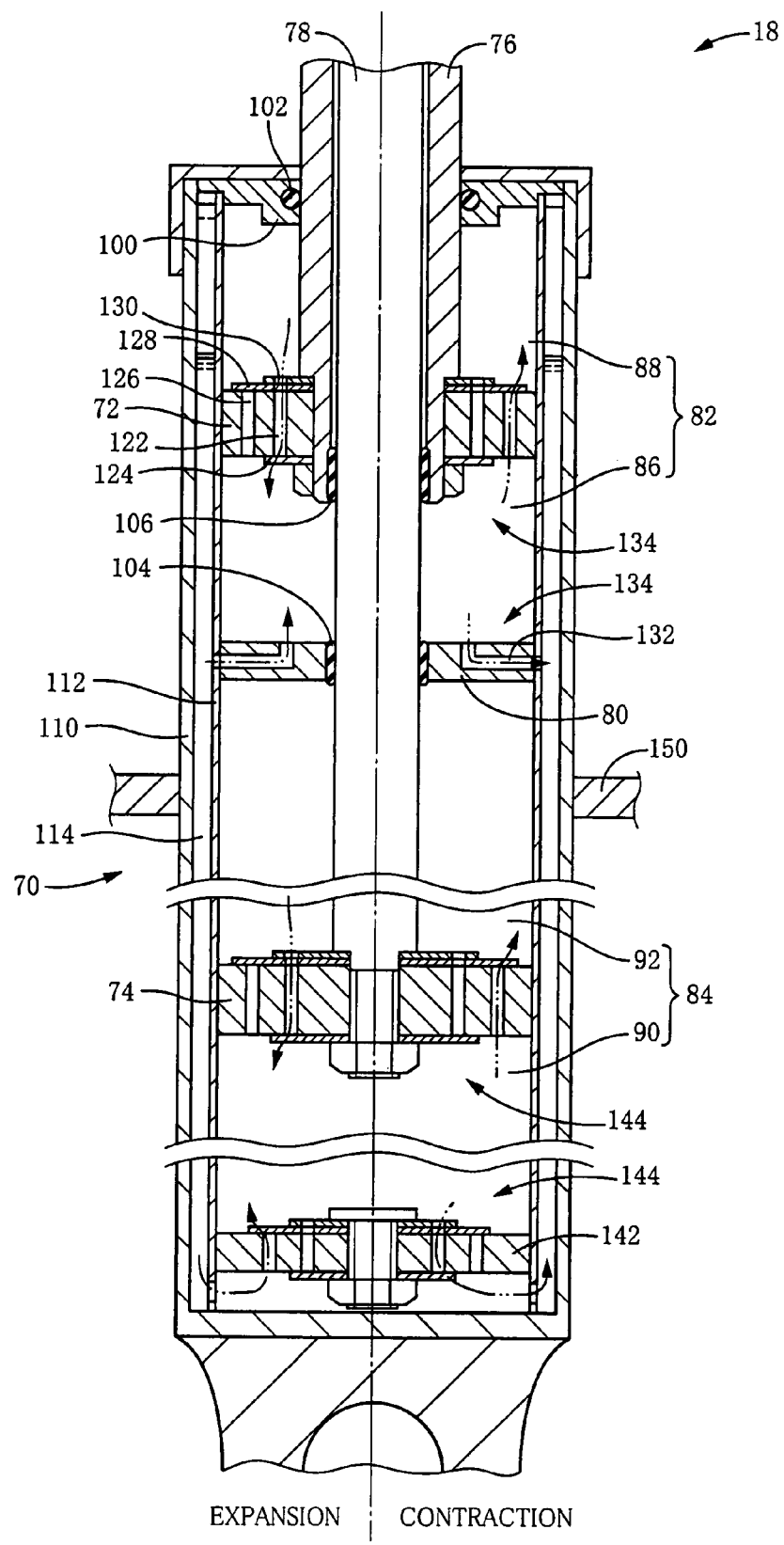
FIG. 3 is a front elevation in cross section showing a damper cylinder of FIG. 2 in enlargement.

The first piston 72 has: a plurality of communication passages 122 (two of which are shown in FIG. 3) for communication between the lower chamber 86 and the upper chamber 88; and a disk-like valve 124 which is formed of an elastic material and which is in contact with a lower surface of the first piston 72. Openings of the communication passages 122 on the side of the lower chamber 86 are closed by the valve 124. The first piston 72 further has: a plurality of communication passages 126 (two of which are shown in FIG. 3) which are located apart from the communication passages 122 in a radial direction; and a disk-like valve 128 which is formed of an elastic material and which is in contact with an upper surface of the first piston 72. Openings of the communication passages 126 on the side of the upper chamber 88 are closed by the valve 128. Each communication passage 126 is located at a position which is radially outwardly of each communication passage 122 and which is outside the valve 124. Accordingly, the communication passages 126 are kept in communication with the lower chamber 86. Openings of the communication passages 122 on the side of the upper chamber 88 are open owing to openings 130 formed in the valve 128, whereby the communication passages 122 are kept in communication with the upper chamber 88. The partition wall 80 is formed with fluid passages 132 through which the lower chamber 86 and the buffer chamber 114 communicate with each other, whereby changes in the storage amounts of the working fluid in the lower chamber 86 and the upper chamber 88 are absorbed. While not shown, each fluid passage 132 is formed with an orifice by which a resistance is imparted to a flow of the working fluid therethrough.

According to the structure described above, where the first piston 72 is moved upward in the housing 70, for instance, a part of the working fluid in the upper chamber 88 flows into the lower chamber 86 through the communication passages 122 while a part of the working fluid in the buffer chamber 114 flows into the lower chamber 86 through the fluid passages 132. On this occasion, a resistance force is imparted to the upward movement of the first piston 72 owing to the flow of the working fluid into the lower chamber 86 as a result of deflection of the valve 124 by the working fluid and owing to the passage of the working fluid through the orifices of the fluid passages 132. Accordingly, there is generated, by the resistance force, a damping force with respect to the upward movement of the first piston 72. On the other hand, where the first piston 72 is moved downward in the housing 70, a part of the working fluid in the lower chamber 86 flows into the upper chamber 88 through the communication passages 126 while flowing into the buffer chamber 114 through the fluid passages 132. On this occasion, a resistance force is imparted to the downward movement of the first piston 72 owing to the flow of the working fluid into the upper chamber 88 as a result of deflection of the valve 128 by the working fluid and owing to the passage of the working fluid through the orifices of the fluid passages 132. Accordingly, there is generated, by the resistance force, a damping force with respect to the downward movement of the first piston 72. In other words, there is constituted a first flow-resistance imparting mechanism 134 for imparting a resistance to the flow of the fluid between the upper chamber 88 and the lower chamber 86 associated with the movement of the first piston 72, by including the communication passages 122, 126, the valves 124, 128, the fluid passages 132, the orifices formed in the fluid passages 132, etc. It is noted that the first piston 72 is coupled to the wheel-side unit 60 of the actuator cylinder 16 by the first piston rod 76. In this respect, there is constituted, in the suspension apparatus 10 of the present embodiment, a first hydraulic damper for generating a damping force with respect to the relative movement of the actuator cylinder 16 and the suspension lower arm 12, by including the housing 70, the first piston 72, the first piston rod 76, the first flow-resistance imparting mechanism 134, etc.

A mechanism of generating a damping force with respect to a movement of the second piston 74 is similar to that described above in relation to the first piston 72, and the mechanism will be briefly explained. The second piston 74 has communication passages and valves similar to those provided in the first piston 72. Where the second piston 74 moves in the housing 70, a resistance is imparted to a flow of the working fluid between the upper chamber 92 and the lower chamber 90 owing to the function of the communication passages and the valves. The lower chamber 90 of the second working-fluid storing portion 84 is held in communication with the buffer chamber 114 for absorbing changes in the storage amounts of the working fluid in the lower chamber 90 and the upper chamber 92. Between the lower chamber 90 and the buffer chamber 114, there is disposed a base valve member 142 in which are formed communication passages and valves similar to those provided in the first piston 72, whereby a resistance is imparted to a flow of the fluid between the lower chamber 90 and the buffer chamber 114 associated with the movement of the second piston 74. These resistances act as a resistance force to the movement of the second piston 74, so that a damping force with respect to the movement is generated by the resistance force. That is, there is constituted a second flow-resistance imparting mechanism 144 for imparting a resistance to the flow of the working fluid between the upper chamber 92 and the lower chamber 90 associated with the movement of the second piston 74, by including the communication passages, the valves and the like formed in the second piston 74 and the base valve member 142. The second piston 74 is coupled, by the second piston rod 78, to the body-side unit 62 that is coupled to the mount portion 14. Accordingly, it may be considered that the second piston 74 is coupled directly to the mount portion 14. In this respect, there is constituted, in the suspension apparatus 10 of the present embodiment, a second hydraulic damper for generating a damping force with respect to the relative movement of the mount portion 14 and the suspension lower arm 12, by including the housing 70, the second piston 74, the second piston rod 78, the second flow-resistance imparting mechanism 144, etc.

The thus constructed damper cylinder 18 of the present suspension apparatus 10 includes two hydraulic dampers, i.e., a first hydraulic damper Ds disposed in series with the actuator cylinder 16 as the electromagnetic actuator and a second hydraulic damper Dp disposed in parallel with the actuator cylinder 16, as shown in the arrangement of FIG. 1(*c*). The first and second hydraulic dampers are made integral with each other. Since the damper cylinder 18 is disposed between the actuator cylinder 16 and the suspension lower arm 12, it is possible to effectively mitigate not only transmission of the vibration from the wheel to the vehicle body but also transmission of the vibration to the actuator cylinder 16. In the present suspension apparatus 10, the damper cylinder 18 and the actuator cylinder 16 are disposed coaxially with each other.

The suspension apparatus 10 according to the exemplary embodiment is provided with a cylindrical cover tube 150. More specifically described, the cover tube 150 is fixed at its lower end to an outer circumferential portion of the housing 70 of the damper cylinder 18. The cover tube 150 is disposed so as to cover an upper portion of the damper cylinder 18 and a lower portion of the actuator cylinder 16. An upper portion of an inner wall surface of the cover tube 150 is in contact with the outer tube 30 of the actuator cylinder 16 via two bushing 152, 154 attached to the upper portion of the inner wall surface, whereby the cover tube 150 and the actuator cylinder 16 are made movable relative to each other. Further, a coil spring 156 is disposed between a bottom wall of the cover tube 150 and the lower end of the outer tube 30 for supporting the cover tube 150 and the outer tube 30 relative to each other. The coil spring 156 functions as a support spring Sb disposed in parallel with the first hydraulic damper shown in FIG. 1(*c*). It is noted that the coil spring 156 has a spring constant larger than that of the coil spring 20 as the suspension spring.

The thus constructed cover tube 150 is configured to accommodate the first piston rod 76 extending from the housing 70 of the damper cylinder 18, the seal 102 attached to the upper end of the housing 70, and the coil spring 156. Therefore, the present suspension apparatus 10 is capable of effectively preventing entry of dust and the like into the damper cylinder 18 and impingement of pebbles and the like thrown up by the wheel upon the first piston rod 76, the coil spring 156, etc. In this connection, a seal 158 is attached to the upper end of the cover tube 150 for preventing entry of the dust and the like.

The cover tube 150 has an annular lower retainer 160 provided on its outer circumferential portion. The coil spring 20 as the suspension spring is supported by the lower retainer 160 and an annular upper retainer 162 which is provided on the lower surface of the mount portion 14 while being sandwiched therebetween. That is, the lower retainer 160 functions as a spring-supporting portion for supporting a lower end of the coil spring 20 coupled to the lower arm 12.

There will be explained a vibration damping function of the suspension apparatus 10 according to the present embodiment. The actuator cylinder 16 is configured to damp vibrations by controlling the motor 44 and capable of effectively absorbing relatively low-frequency vibrations having a frequency of not greater than 5 Hz such as a pitching vibration and a bouncing vibration. However, in relation to control response, the actuator cylinder 16 is not capable of effectively absorbing vibrations whose frequency exceeds 15 Hz such as vibrations transmitted from a road surface during traveling of the vehicle on a rough road surface. Further, the actuator cylinder 16 is not capable of sufficiently absorbing relatively high-frequency vibrations whose frequency is around 10 Hz such as vibrations and unsprung resonance which are generated during traveling of the vehicle on a bumpy road surface having continuous bumps and dips. In the present embodiment, the vibrations that cannot be sufficiently damped by the actuator cylinder 16 can be damped by the damper cylinder 18 as the hydraulic damper. As explained above, the damper cylinder 18 is configured such that the two hydraulic dampers which are respectively disposed in series with and in parallel with the actuator cylinder 16 are made integral with each other. The first hydraulic damper disposed in series with the actuator cylinder 16 is configured to deal with the high-frequency vibrations whose frequency exceeds 15 Hz while the second hydraulic damper is configured to deal with the relatively high-frequency vibrations whose frequency is around 10 Hz. Accordingly, the present suspension apparatus 10 assures an effective damping effect with respect to various vibrations having wide-ranging frequencies, so that the damping characteristics of the present suspension system 10 are made appropriate.

2. Second Embodiment

Figure 4:
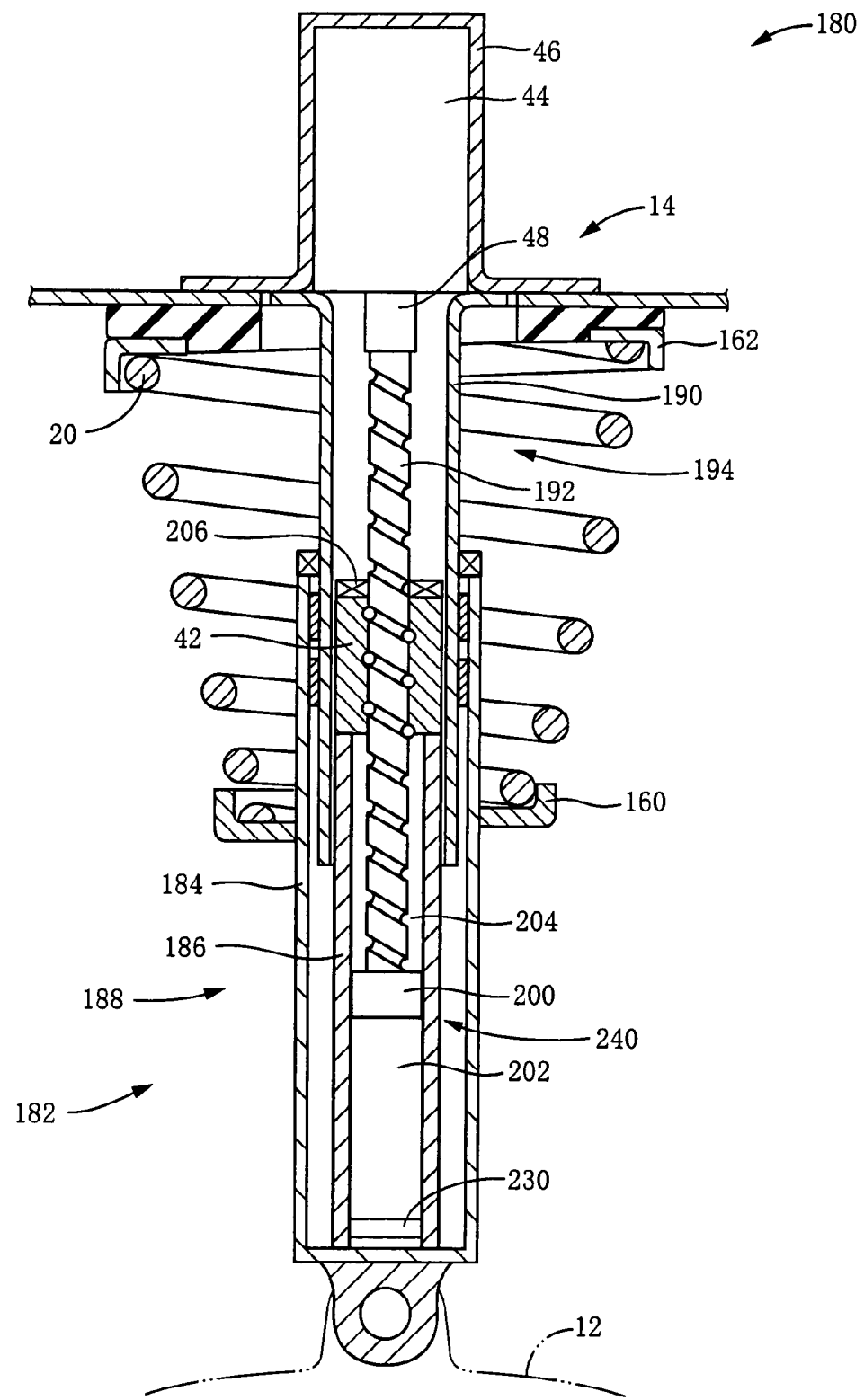
FIG. 4 is a front elevation in cross section showing a suspension apparatus for a vehicle according to a second embodiment.

FIG. 4 shows a suspension apparatus 180 for a vehicle according to a second embodiment. The suspension apparatus 180 of the second embodiment is substantially identical in construction with the suspension apparatus 10 of the illustrated first embodiment, except for the hydraulic damper. Accordingly, in the description of the second embodiment, the same reference numerals as used in the apparatus of the first embodiment are used to identify the corresponding components, and an explanation of which is simplified or omitted.

The suspension apparatus 180 of the exemplary embodiment is constituted principally by an actuator cylinder 182 which has a structure similar to that of the actuator cylinder 16 of the first embodiment. In other words, the actuator cylinder 182 is configured such that a wheel-side unit 188 is constituted by including an outer tube 184, a nut 42, and a supporting tube 186 while a body-side unit 194 is constituted by including a rod 192 on which an external thread is formed, a motor 44, and a motor casing 46. In the present embodiment, the outer tube 184 is joined directly to the suspension lower arm 12, whereby the wheel-side unit 188 is coupled to the suspension lower arm 12. As in the illustrated first embodiment, the rod 192 and the nut 42 cooperate with each other to constitute a ball screw mechanism and respectively function as an external thread portion provided in the body-side unit 188 and an internal thread portion provided in the wheel-side unit 194. Like the actuator cylinder 16 in the illustrated first embodiment, the actuator cylinder 182 in the second embodiment is equipped with a relative-movement-directional-force generating mechanism for generating a relative-movement-directional force which is at least one of a resistance force and a propulsive force with respect to a relative movement of the wheel-side unit 188 and the body-side unit 194. The relative-movement-directional-force generating mechanism is constituted by including the rod 192, the nut 42, and the motor 44 as the electromagnetic power source. In the present embodiment, unlike the rod 92 and the motor shaft 48 in the first embodiment, the rod 192 and the motor shaft 48 are not hollow.

Figure 5:
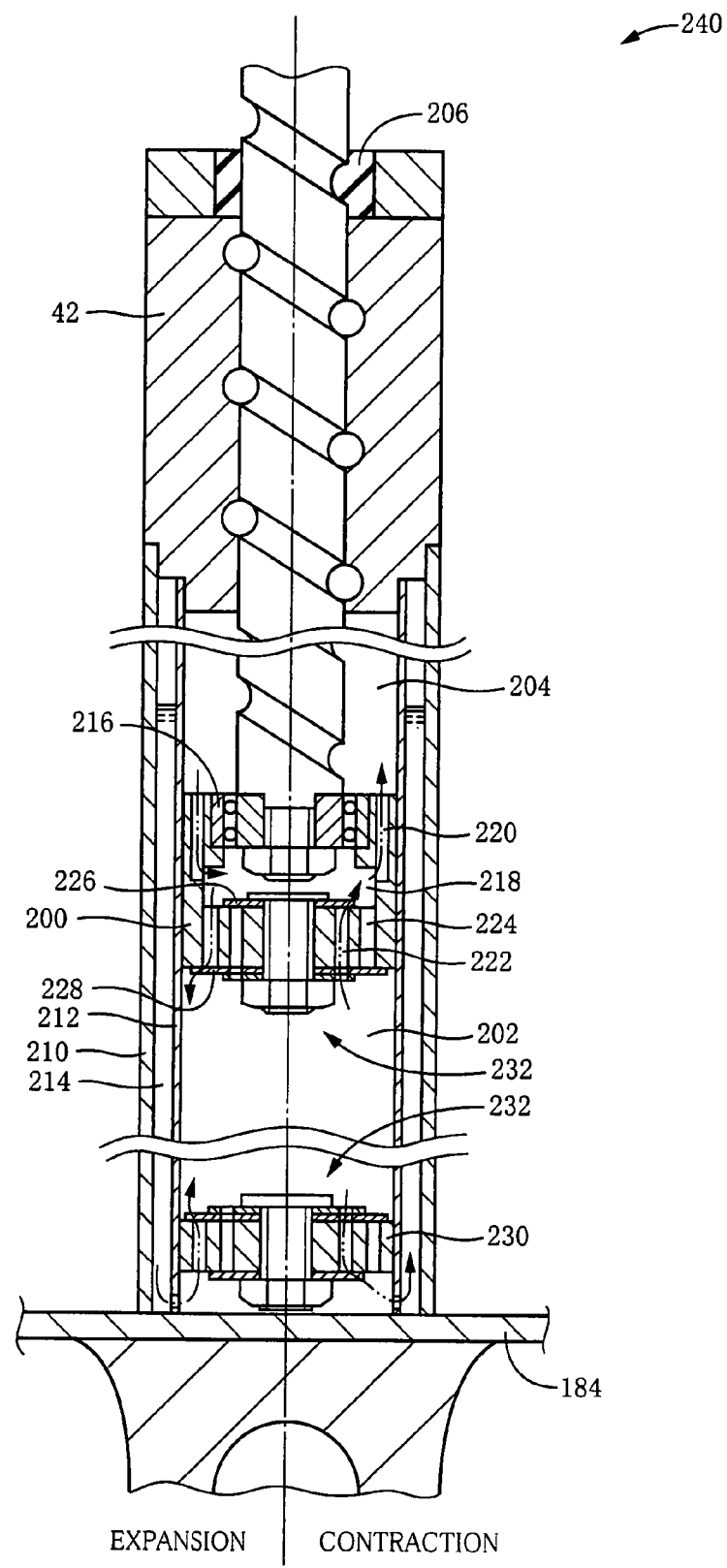
FIG. 5 is a front elevation in cross section showing a hydraulic damper of FIG. 4 in enlargement.

Referring also to FIG. 5, there will be explained the supporting tube 186 and the rod 192 which is inserted thereinto. In the present embodiment, a piston 200 is coupled to a leading end of the rod 192. The piston 200 is fluid-tightly and slidably fitted in the supporting tube 186 which stores therein a working fluid. An interior of the supporting tube 186 is divided by the piston 200 into two fluid chambers, i.e., a lower chamber 202 and an upper chamber 204. A seal 206 is attached to an upper end of the nut 42 for preventing leakage of the working fluid.

The supporting tube 186 is of a twin-tube type consisting of an outer cylindrical member 210 and an inner cylindrical member 212 between which a buffer chamber 214 is formed. The piston 200 indicated above is fluid-tightly and slidably fitted in the inner cylindrical member 212. The piston 200 is coupled to the rod 192 via a bearing 216. Between the piston 200 and the bearing 216, there is formed a fluid chamber 218 which is in communication with the upper chamber 204 through a plurality of fluid passages 220 (two of which are shown in FIG. 5). Each fluid passage 220 is located radially outwardly of and apart from the bearing 216. The piston 200 has communication passages 222, 224 (two of which are shown in FIG. 5) and valves 226, 228 which are similar to those formed in the pistons of the first embodiment. Owing to the function of the communication passages 222, 224 and the valves 226, 228, a resistance is imparted to a flow of the working fluid between the fluid chamber 218 and the lower chamber 202 when the piston 200 moves in the supporting tube 186. The lower chamber 202 is held in communication with a buffer chamber 214 via a base valve member 230 which is similar to the base valve member 142 in the first embodiment, whereby a resistance is imparted to a flow of the working fluid between the lower chamber 202 and the buffer chamber 214 associated with the movement of the piston 200. These resistances act as a resistance force to the movement of the piston 200, so that a damping force with respect to the movement is generated by the resistance force. In other words, there is constituted a flow-resistance imparting mechanism 232 for imparting a resistance to the flow of the working fluid between the upper chamber 204 and the lower chamber 202 associated with the movement of the piston 200, by including the communication passages and the valves formed in the piston 200 and the base valve member 230.

The rod 192 couples the piston 200 to the body-side unit 194 that is coupled to the mount portion 14 and functions as not only a rod which constitutes a part of the body-side unit 194 of the actuator cylinder 182 but also a piston rod which couples the piston 200 to the body-side unit 200. In other words, there is constituted, in the present suspension apparatus 180, a hydraulic damper 240 for generating a damping force with respect to the relative movement of the mount portion 14 and the suspension lower arm 12, by including the supporting tube 186 (functioning as a housing), the piston 200, the rod 192, and the flow-resistance imparting mechanism 232. While the hydraulic damper 240 is disposed coaxially with the actuator cylinder 182 at a lower portion of the same 182, the hydraulic damper corresponds to the damper shown in FIG. 1(*b*), namely, the damper disposed in parallel with the electromagnetic actuator. It may be considered that the hydraulic damper 240 is disposed between the actuator cylinder 182 and the suspension lower arm 12.

As explained above, in the present suspension apparatus 180, when the wheel-side unit 188 and the body-side unit 194 of the actuator cylinder 182 move relative to each other, the rod 192 and the supporting tube 186 move relative to each other in an axial direction of the rod 192 while rotating relative to each other about the axis of the rod 192, owing to the ball screw mechanism. However, the piston 200 is made rotatable relative to the rod 192 about the axis of the same 192 by the bearing 216. Therefore, even though the rod 192 and the supporting tube 186 rotate relative to each other, the piston 200 coupled to the rod 192 does not rotate relative to the supporting tube 186. In other words, the hydraulic damper 240 of the present suspension apparatus 180 is equipped with a rod•piston-relative-rotation permitting mechanism for permitting a relative rotation of the rod 192 of the actuator cylinder 182 and the piston 200 of the hydraulic damper 240. The mechanism ensures a smooth sliding movement of the supporting tube 186 and the piston 200. In consequence, the piston 200 is effectively prevented from being worn, leading to improved durability of the hydraulic damper 240.

In the suspension apparatus 180 according to the present embodiment, it may be considered that the wheel-side unit 188 is constituted by including the nut 42 and the supporting tube 186, namely, the outer tube 184 is not a constituent element of the wheel-side unit 188. In this instance, the outer tube 184 accommodates the supporting tube 186 as the housing of the hydraulic damper 240, the rod 192 as the piston rod extending from the housing, and the seal 206 attached to the upper end of the supporting tube 186. That is, the outer tube 184 functions as a cover tube which is provided immovably relative to the suspension lower arm 12 and which is movable relative to the inner tube 190 that constitutes the body-side unit 194 of the actuator cylinder 182. To an outer circumferential portion of the outer tube 184, there is attached a lower retainer 160 which functions as a spring-supporting portion for supporting the lower end of the coil spring 20 coupled to the lower arm 12.

There will be explained a vibration damping function of the suspension apparatus 180 according to the present embodiment. The actuator cylinder 182 is capable of effectively absorbing the relatively low-frequency vibrations having a frequency of not greater than 5 Hz. However, the actuator cylinder 182 is not capable of sufficiently absorbing the relatively high-frequency vibrations having a frequency around 10 Hz. In the present embodiment, the vibrations that cannot be sufficiently damped by the actuator cylinder 182 can be damped by the hydraulic damper 240, whereby the hydraulic damper 240 assists the actuator cylinder 182 by damping the relatively high-frequency vibrations of around 10 Hz.

3. Third Embodiment

Figure 6:
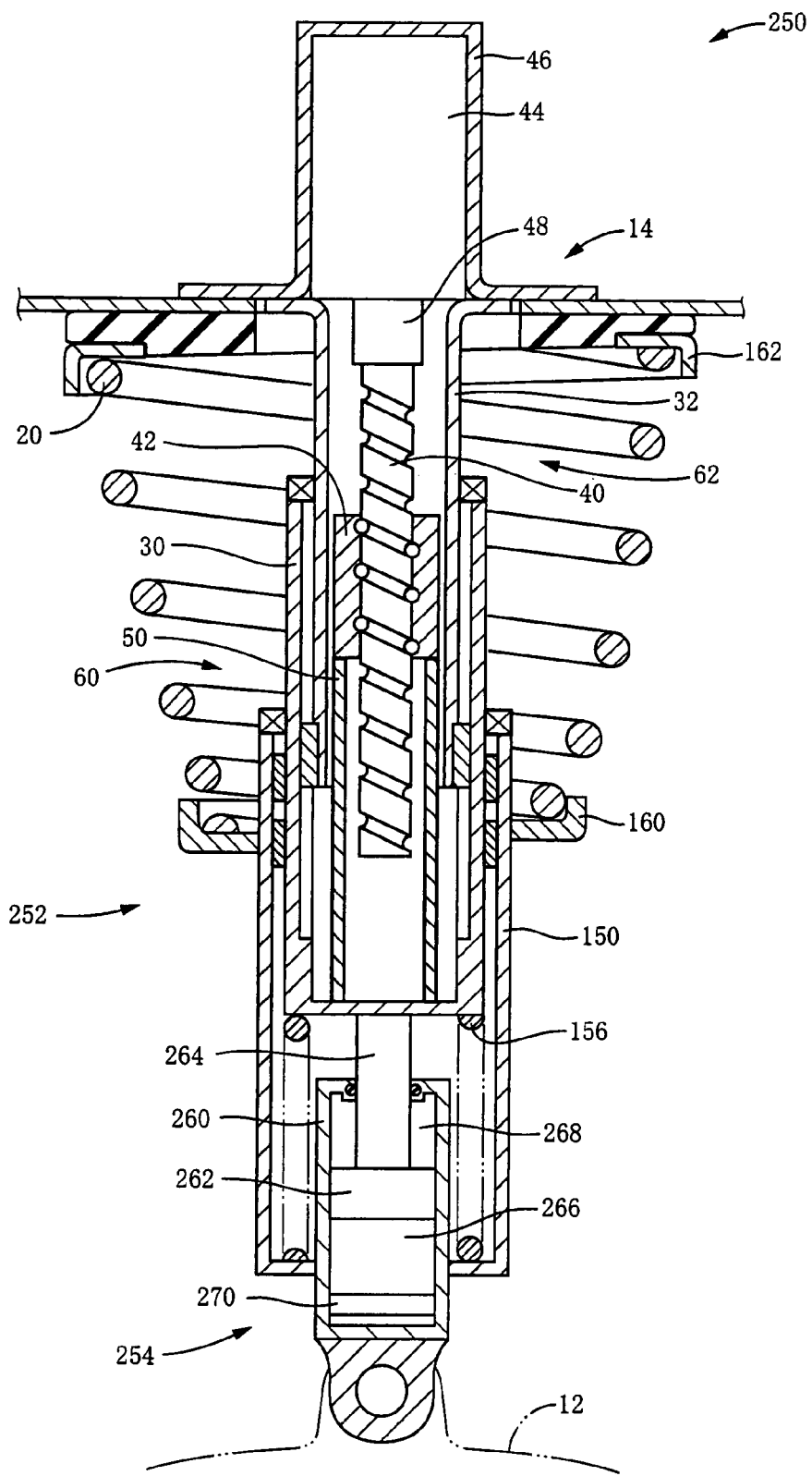
FIG. 6 is a front elevation in cross section showing a suspension apparatus for a vehicle according to a third embodiment.

FIG. 6 shows a suspension apparatus 250 for a vehicle according to a third embodiment. The suspension apparatus 250 of the third embodiment is substantially identical in construction with the suspension apparatus 10 of the illustrated first embodiment, except for the hydraulic damper. Accordingly, in the description of the third embodiment, the same reference numerals as used in the apparatus of the first embodiment are used to identify the corresponding components, and an explanation of which is simplified or omitted.

The suspension apparatus 250 according to the present embodiment is constituted by including an actuator cylinder 252 as the electromagnetic actuator, a damper cylinder 254 as the hydraulic damper, and a coil spring 20 as the suspension spring. Although the actuator cylinder 252 is similar to the actuator cylinder 16 in the first embodiment, the rod 40 and the motor shaft 48 of the motor 44 in the present embodiment are not hollow, unlike those in the first embodiment.

Like the damper cylinder 18 in the first embodiment, the damper cylinder 252 is disposed between the actuator cylinder 252 and the lower arm 12. The damper cylinder 254 is constituted by including: a housing 260 coupled to the lower arm 12 and storing a working fluid; a piston 262 fluid-tightly and slidably fitted in the housing 260; and a piston rod 264 having a lower end (as a first end) to which the piston 262 is coupled and an upper end (as a second end) which extends upward from the housing 260. An interior of the housing 260 is divided by the piston 262 into two fluid chambers, i.e., a lower chamber 266 and an upper chamber 268. Like the housing 70 in the first embodiment, the housing 260 is of a twin-tube type, and a buffer chamber, not shown, is formed therein.

The piston 262 has communication passages and valves similar to those of the piston in the illustrated first embodiment. Owing to the function of the communication passages and the valves, a resistance is imparted to a flow of the working fluid between the two fluid chambers 266, 268 when the piston 262 moves in the housing 260. The lower chamber 266 is held in communication with the buffer chamber via a base valve member 270 in which are formed communication passages and valves similar to those formed in the base valve member in the first embodiment, whereby a resistance is imparted to a flow of the working fluid between the lower chamber 266 and the buffer chamber associated with the movement of the piston 262. These resistances act as a resistance force to the movement of the piston 262, whereby a damping force with respect to the movement is generated by the resistance force. That is, the damper cylinder 254 is equipped with a flow-resistance imparting mechanism for imparting a resistance to the flow of the working fluid between the upper chamber 268 and the lower chamber 266 associated with the movement of the piston 260. The flow-resistance imparting mechanism is constituted by including the communication passages and the valves formed in the piston 262 and the base valve member 270.

The piston rod 264 is fixedly coupled at its upper end to the lower end of the outer tube 30. The damper cylinder 254 of the present suspension apparatus 250 is a hydraulic damper which generates a damping force with respect to the relative movement of the actuator cylinder 252 and the lower arm 12. That is, the damper cylinder 254 corresponds to the damper shown in FIG. 1(a), namely, the damper disposed in series with the electromagnetic actuator.

There will be explained a vibration damping function of the suspension apparatus 250 according to the present embodiment. The actuator cylinder 252 is capable of effectively absorbing the relatively low-frequency vibrations having a frequency of not greater than 5 Hz. However, the actuator cylinder 252 is not capable of sufficiently absorbing the high-frequency vibrations having a frequency exceeding 15 Hz. In the present embodiment, the vibrations that cannot be effectively damped by the actuator cylinder 252 can be damped by the damper cylinder 254, so that the high-frequency vibrations whose frequency exceeds 15 Hz can be effectively absorbed.

As in the suspension apparatus in the first embodiment, a cover tube 150 is provided in the suspension apparatus 250 according to the present embodiment. The cover tube 150 covers a portion of the piston rod 264 that extends from the housing 260 and the support spring 156. The structure and the function of the cover tube 150 are similar to those described in the first embodiment, and an explanation of which is dispensed with.

The invention claimed is:

1. A suspension apparatus for a vehicle comprising:
an electromagnetic actuator including (a) a wheel-side unit coupled to a wheel-holding portion for holding a wheel of the vehicle, (b) a body-side unit which is coupled to a mount portion formed at a part of a body of the vehicle and which is movable relative to the wheel-side unit in correspondence with a relative movement of the wheel-holding portion and the mount portion, and (c) a relative-movement-directional-force generating mechanism which includes an electromagnetic power source and which generates a resistance force with respect to the relative movement of the wheel-side unit and the body-side unit, the electromagnetic actuator being configured to generate a damping force with respect to the relative movement of the wheel-holding portion and the mount portion;
a hydraulic damper including: a housing which stores a working fluid; a piston which divides an interior of the housing into two fluid chambers; a flow-resistance imparting mechanism which imparts a resistance to a flow of the working fluid between the two fluid chambers associated with a movement of the piston; and a piston rod having a first end which is coupled to the piston and a second end which extends from the housing, the hydraulic damper being disposed between the wheel-holding portion and the electromagnetic actuator so as to be arranged to act in series with the electromagnetic actuator, the housing being coupled to the wheel-holding portion while the second end of the piston rod being coupled to the wheel-side unit of the electromagnetic actuator, the hydraulic damper being configured to generate a damping force with respect to the relative movement of the wheel-holding portion and the electromagnetic actuator;

a suspension spring which is disposed between the wheel-holding portion and the mount portion, which is supported at one end thereof by the mount portion, and which establishes a connection between the wheel holding portion and the mount portion that does not include the electromagnetic actuator, for supporting the wheel-holding portion and the mount portion relative to each other;

a support spring which is disposed between the wheel-side unit of the electromagnetic actuator and the wheel-holding portion for supporting the wheel-side unit and the wheel-holding portion relative to each other; and a generally cylindrical cover tube which is disposed such that one end thereof is immovable relative to the wheel-holding portion while the other end thereof is movable relative to the body-side unit of the electromagnetic actuator, which accommodates therein at least a part of the piston rod of the hydraulic damper that extends from the housing and the support spring, and which includes a spring-supporting portion formed on an outer circumferential portion of the cover tube for supporting another end of the suspension spring opposite to said one end of the suspension spring.

2. The suspension apparatus according to claim 1, wherein the suspension spring is a coil spring and the electromagnetic actuator is disposed so as to penetrate the coil spring.

3. The suspension apparatus according to claim 1,
wherein the relative-movement-directional-force generating mechanism of the electromagnetic actuator includes: an external thread portion which is provided in one of the wheel-side unit and the body-side unit immovably relative thereto; an internal thread portion which is provided in the other of the wheel-side unit and the body-side unit immovably relative thereto and which engages the external thread portion; and an electromagnetic motor as the electromagnetic power source for applying a relative rotational force to the external thread portion and the internal thread portion, and
wherein the relative-movement-directional-force generating mechanism is configured to generate the relative-movement-directional force by the relative rotational force applied by the motor.

4. The suspension apparatus according to claim 3, wherein the relative-movement-directional-force generating mechanism is configured such that the external thread portion is provided in the body-side unit immovably relative thereto while the internal thread portion is provided in the wheel-side unit immovably relative thereto and such that the electromagnetic motor is fixed to the mount portion for applying a rotational force to the external thread portion.

5. The suspension apparatus of claim 1, wherein the suspension spring is disposed outside of the cover tube.

6. A suspension apparatus for a vehicle comprising:
an electromagnetic actuator including (a) a wheel-side unit coupled to a wheel-holding portion for holding a wheel of the vehicle, (b) a body-side unit which is coupled to a mount portion formed at a part of a body of the vehicle and which is movable relative to the wheel-side unit in correspondence with a relative movement of the wheel-holding portion and the mount portion, and (c) a relative-movement-directional-force generating mechanism which includes an electromagnetic power source and which generates a resistance force with respect to the relative movement of the wheel-side unit and the body-side unit, the electromagnetic actuator being configured to generate a damping force with respect to the relative movement of the wheel-holding portion and the mount portion;

a hydraulic damper including: a housing which stores a working fluid; a piston which divides an interior of the housing into two fluid chambers; a flow-resistance imparting mechanism which imparts a resistance to a flow of the working fluid between the two fluid chambers associated with a movement of the piston; and a piston rod having a first end which is coupled to the piston and a second end which extends from the housing, the hydraulic damper being disposed between the wheel-holding portion and the electromagnetic actuator so as to be arranged to act in series with the electromagnetic actuator, the housing being coupled to the wheel-holding portion while the second end of the piston rod being coupled to the wheel-side unit of the electromagnetic actuator, the hydraulic damper being configured to generate a damping force with respect to the relative movement of the wheel-holding portion and the electromagnetic actuator;

a suspension spring which is disposed between the wheel-holding portion and the mount portion, which is supported at one end thereof by the mount portion, and which establishes a connection between the wheel holding portion and the mount portion that does not include the electromagnetic actuator, for supporting the wheel-holding portion and the mount portion relative to each other;

a support spring which is disposed between the wheel-side unit of the electromagnetic actuator and the wheel-holding portion for supporting the wheel-side unit and the wheel-holding portion relative to each other; and a generally cylindrical cover tube which is disposed such that one end thereof is immovable relative to the wheel-holding portion while the other end thereof is movable relative to the body-side unit of the electromagnetic actuator, which accommodates therein at least a part of the piston rod of the hydraulic damper that extends from the housing and the support spring, and which includes a spring-supporting portion formed on an outer circumferential portion of the cover tube for supporting another end of the suspension spring opposite to said one end of the suspension spring, wherein the support spring is disposed below the suspension spring.

7. The suspension apparatus of claim 6, wherein the wheel-side unit including an outer tube, and the support spring being disposed between a bottom wall of the cover tube and a lower end of the outer tube.

\* \* \* \* \*

UNITED STATES PATENT AND TRADEMARK OFFICE
CERTIFICATE OF CORRECTION

PATENT NO. : 8,544,620 B2  Page 1 of 1
APPLICATION NO. : 11/791320
DATED : October 1, 2013
INVENTOR(S) : Inoue et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1391 days.

Signed and Sealed this
Fifteenth Day of September, 2015

Michelle K. Lee
*Director of the United States Patent and Trademark Office*